United States Patent
Saravanan et al.

(10) Patent No.: US 7,246,942 B2
(45) Date of Patent: Jul. 24, 2007

(54) THERMOMETER

(75) Inventors: Balasubramanian Saravanan, Tamilnadu (IN); Sambamurthy Jayaraman Suresh, Kamataka (IN); Vijay Mukund Naik, Kamataka (IN); David Chandra Franklin, Kamataka (IN)

(73) Assignee: Conopco, Inc., Edgewater, NJ (US)

( * ) Notice: Subject to any disclaimer, the term of this patent is extended or adjusted under 35 U.S.C. 154(b) by 163 days.

(21) Appl. No.: 10/513,376

(22) PCT Filed: Apr. 16, 2003

(86) PCT No.: PCT/EP03/03985

§ 371 (c)(1),
(2), (4) Date: Jun. 6, 2005

(87) PCT Pub. No.: WO03/095959

PCT Pub. Date: Nov. 20, 2003

(65) Prior Publication Data

US 2005/0232335 A1 Oct. 20, 2005

(30) Foreign Application Priority Data

May 8, 2002 (IN) .................................... 417/02

(51) Int. Cl.
*G01K 5/00* (2006.01)

(52) U.S. Cl. .......................................... 374/201; 10/57

(58) Field of Classification Search ................ 374/201; D10/57

See application file for complete search history.

(56) References Cited

U.S. PATENT DOCUMENTS

| 3,469,452 | A |   | 9/1969 | Ayres |
| 3,555,906 | A | * | 1/1971 | Ayres ........................ 374/105 |
| 4,170,138 | A |   | 10/1979 | Wiebe |
| 4,907,896 | A |   | 3/1990 | Martuscello et al. |
| 6,749,336 | B2 | * | 6/2004 | Wu et al. .................... 374/190 |

FOREIGN PATENT DOCUMENTS

| DE | 1 144 506 | 6/1961 |
| DE | 1 573 359 | 5/1965 |
| EP | 0 960 322 | 11/1997 |
| EP | 0 960 322 A | 12/1999 |
| WO | 98/33048 | 7/1998 |
| WO | 00/54014 | 9/2000 |

OTHER PUBLICATIONS

E. Greil: "Das Einbrennen von Messgerateskalen auf Glas mit Strahlungswarme" Glas Und Instrumenten-Technik, vol. 14, No. 9, Sep. 1970, pp. 1027-1040, XP008020111 p. 1038-p. 1039.

* cited by examiner

*Primary Examiner*—Brij Shrivastav
*Assistant Examiner*—Megann E Vaughn
(74) *Attorney, Agent, or Firm*—Michael P. Aronson

(57) ABSTRACT

A liquid-in-stem thermometer comprising a stem and/or an envelope having a capillary bore extending along the length of the stem/envelopes, a bulb disposed at one end of the stem/envelope and in fluid communication with the said bore, a junction region between the capillary and the bulb adapted for maximum registration action, a thermometric liquid provided in the bulb, the said thermometric liquid being an aqueous solution of one or more solutes and substantially free of dissolved gases, at least the inner surface of the capillary bore of said stem/envelope having low surface energy characteristics, wherein the surface tension of the thermometric liquid is greater than the surface energy of the said low surface energy material by a factor of at least two.

6 Claims, 2 Drawing Sheets

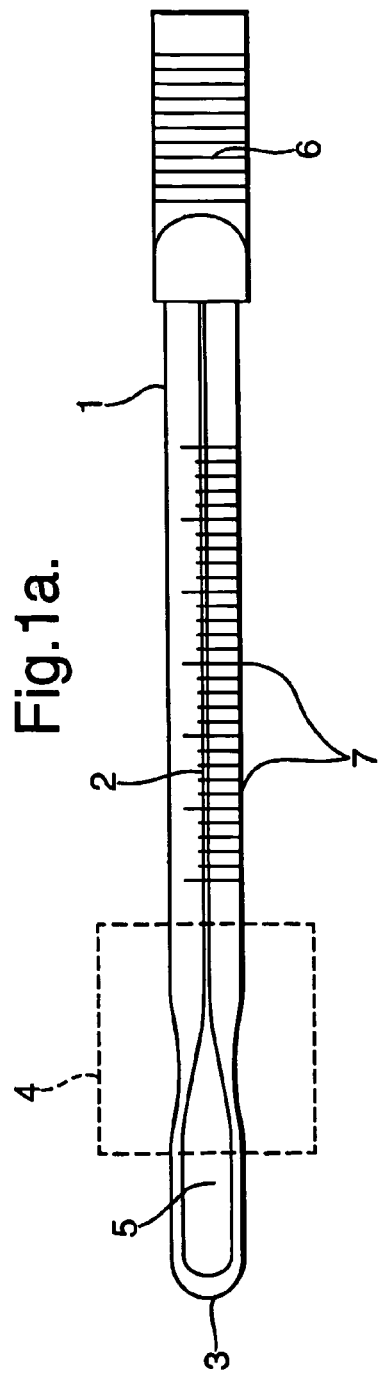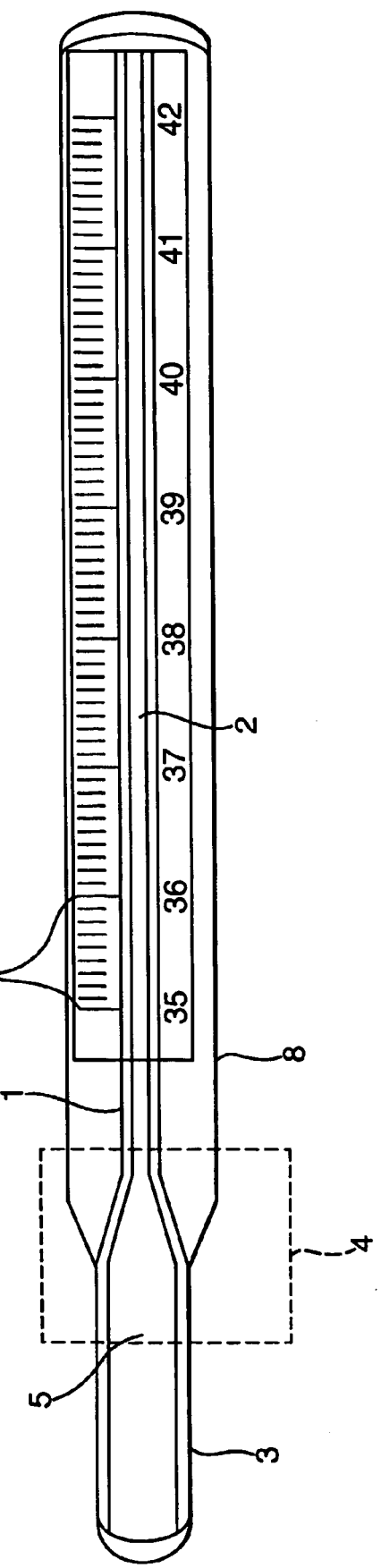

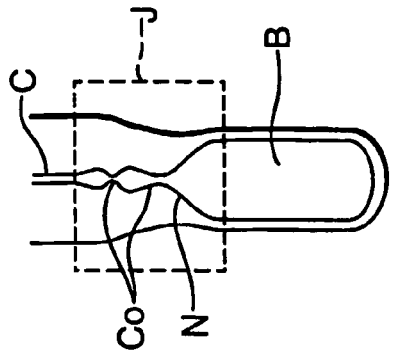
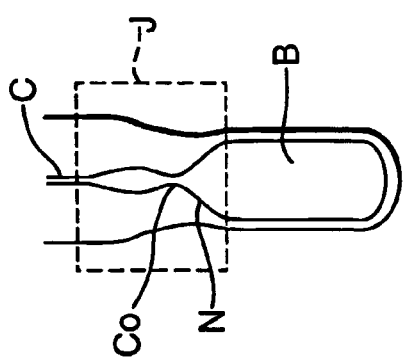
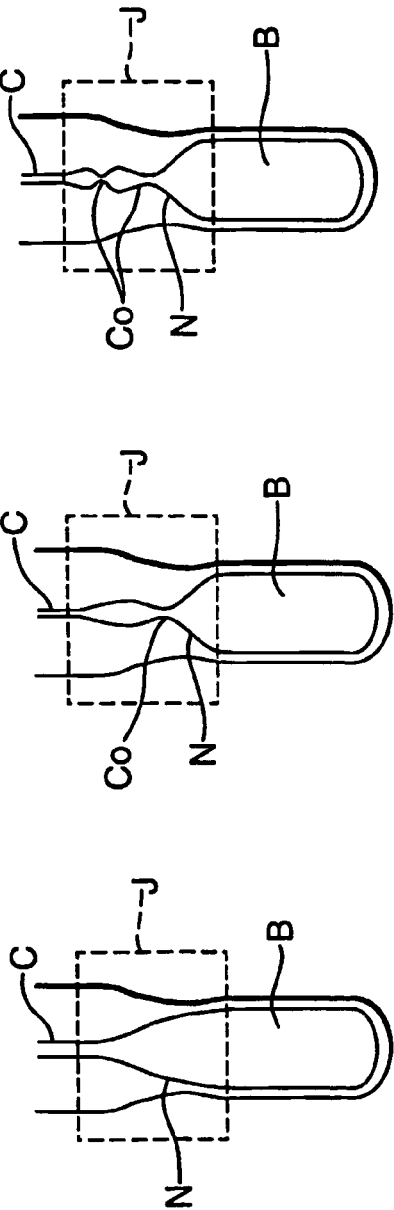
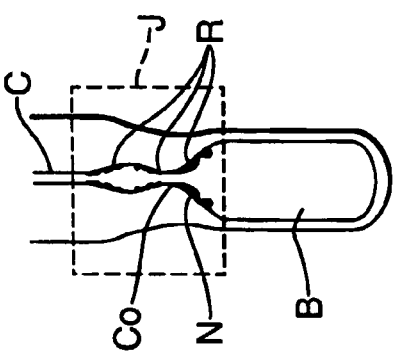
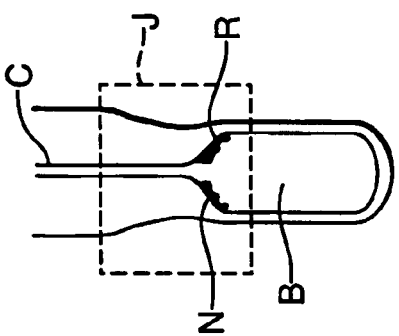
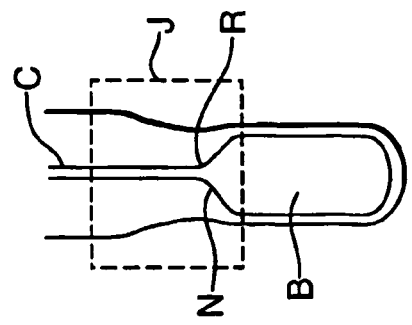

THERMOMETER

TECHNICAL FIELD

The present invention relates to an accurate, single-use or multiple-use, non mercury, liquid-in-stem thermometer that exhibits maximum registration. The invention also relates to a process for making such a thermometer.

BACKGROUND OF THE INVENTION

The liquid-in-stem thermometer in its simplest form comprises of a transparent tubular stem with a capillary bore at one end, a bulb fused to the stem at the other end, and a thermometric liquid in the bulb. Typically, a graduated scale is engraved in or attached to a portion of the stem. Sometimes, the stem is encased in an Envelope of transparent material and the graduations are marked on a scale which is located inside the envelope. As is well known, the expansion or contraction of the liquid in the bulb caused by changes in the temperature of the liquid forces the liquid to traverse the capillary of the stem to or from the bulb. Provided that the thermometer has been properly calibrated, the position of the meniscus of the liquid column in the capillary on the graduated scale indicates the temperature being measured.

When thermometers are designed for use in clinical applications the capillary in the stem has a constriction near the bulb. When the bulb is brought into thermal contact with a warm body, a column of the thermometric liquid freely rises in the capillary of the stem and when the bulb is moved away from the source of heat, the thermometric liquid in the bulb contracts but the liquid column in the capillary above the constriction is not withdrawn into the bulb, thus providing the maximum registration action. Such thermometers are reset by centrifugation or manual shake down.

There are also other ways of constructing clinical thermometers with maximum registration action, such as through the use of electronic, electrical, mechanical, optical and tympanic thermometers. However, liquid-in-stem clinical thermometers are very popular because they are inexpensive, accurate, fairly trouble-free and give reproducible results.

Mercury is the most commonly used thermometric liquid and glass is a commonly used material of construction of the maximum registration thermometer. However, such thermometers have several drawbacks. Being made of glass, potential breakage is a problem. Secondly, breakage results in spilled mercury and mercury is known to be toxic. Several methods in the prior art have been directed towards i) preventing spillage and ii) replacing mercury with a non-toxic, environment-friendly thermometric liquid. Several thermometric liquids have been proposed as alternatives to mercury. These include metallic alloys, alcohol and glycerol. However these thermometric liquids still have one or more drawbacks in terms of toxicity, poor accuracy, split in the liquid column, loss of maximum registration, etc.

PRIOR ART

EP960322 (Unilever PLC) discloses a non mercury thermometer wherein the thermometric liquid is an aqueous solution of one or more solutes, having a surface tension greater than that of water and being substantially free of dissolved gases. The inner surface of the capillary bore is a low surface energy material, the surface energy of the said low surface energy material being lower than the surface tension of the thermometric liquid by a factor of at least two. The presence of a constriction of a low energy material in the capillary provides for the maximum registration of temperature.

OBJECTS OF THE INVENTION

It is an object of the invention to provide for improved accurate, single or multiple-use non-mercury, liquid-in-stem type thermometers that exhibit maximum registration and do not show thread breakage.

It is a further object of the invention to provide for a process to make such thermometers.

SUMMARY OF THE INVENTION

Thus according to an aspect of the present invention there is provided a liquid-in-stem thermometer comprising a stem and/or an envelope having a capillary bore extending along the length of the stem/envelopes, a bulb disposed at one end of the stem/envelope and in fluid communication with the said bore, a junction region between the capillary and the bulb adapted for maximum registration action, a thermometric liquid provided in the bulb, the said thermometric liquid being an aqueous solution of one or more solutes and substantially free of dissolved gases, at least the inner surface of the capillary bore of said stem/envelope having low surface energy characteristics, wherein the surface tension of the thermometric liquid is greater than the surface energy of the said low surface energy material by a factor of at least two.

According to another aspect of the present invention is to provide a process for manufacture of a liquid-in-stem thermometer comprising the following steps:

i) providing a stem/envelope having a capillary bore with at least the inner surface of the bore of a low surface energy material;

ii) providing a bulb for thermometric liquid at one end of said stem/envelope and in fluid communication with said capillary bore, the junction region of the bulb and the capillary bore adapted to constitute means for maximum registration;

iii) filling the thermometer, under vacuum, with a thermometric liquid substantially free of dissolved gases having an aqueous solution containing at least one non-toxic solute material that negatively adsorb at the air (vapour)-water interface;

iv) storing the thus filled thermometer under conditions such as to prevent leakage of air into the capillary before sealing of the stem;

v) sealing the thermometer near the open end of the stem;

vi) calibrating the thermometer.

DETAILED DESCRIPTION OF THE INVENTION

FIG. 1 is a non-limiting embodiment of the thermometer as claimed in the invention. The numbers referred to below are indicated in FIG. 1.

According to the first aspect of the invention there is provided a thermometer comprising a stem (1) and/or an envelope (8), having a capillary bore (2) extending along the length of the stem, a bulb (3) disposed at one end of the stem and in fluid communication with the said bore, a junction (4) being provided between the capillary and the bulb and being appropriately designed for improved performance of maximum registration action, a thermometric liquid (5) provided in the bulb, the said thermometric liquid being an aqueous solution of one or more solutes, said thermometric liquid being substantially free of dissolved gases and the inner surface of the capillary bore having low surface energy characteristics, wherein the surface tension of the thermometric liquid is greater than the surface energy of the said low surface energy material by a factor of at least two.

In embodiments of the present invention, the entire stem can be made of the low surface energy material. It is however preferable that the internal face of the capillary bore and junction is coated with such low surface-energy material. As will be appreciated, the use of a suitable low surface energy material enables thermometers to be made of a material other than glass. It is believed that the use of materials other than glass for the construction of the thermometer can significantly reduce the incidence of breakage.

According to the second aspect of the invention, there is provided a process to manufacture a maximum registration, single-use or multiple-use, non-mercury, liquid-in-stem thermometer comprising the following steps:

1. Providing a stem having a capillary bore, the inner surface thereof comprising a low surface energy material.
2. Providing for a bulb at one end of the stem.
3. Providing for a suitably designed junction between the bulb and the capillary bore of the stem.
4. Filling the thermometer, under vacuum, with a thermometric liquid that is substantially free of dissolved gases, wherein the thermometric liquid is an aqueous solution containing one or more non-toxic solute materials that negatively adsorb at the air (or vapour)-water interface.
5. Storing the filled thermometers under specific conditions to prevent leakage of air into the capillary before sealing the stem.
6. Sealing the thermometer near the open end of the stem without causing the degradation of low energy coating and without forming blisters/puncture holes by vapourised thermometric liquid.
7. Calibrating the thermometer.
8. Printing on the stem of the thermometer, to mark the calibrations, and baking the ink under conditions which will not cause the thermometric liquid to vaporize or the coating chemical to be charred.

All parts herein are by weight unless otherwise specified.

The present invention provides for a thermometer comprising of a stem having a capillary bore extending along the length of the stem, a bulb disposed at one end of the stem and in fluid communication with the said bore, a junction being provided between the stem and the bulb, a thermometric liquid provided in the bulb, the said thermometric liquid being an aqueous solution of one or more solutes and being substantially free of dissolved gases. The inner surface of the bulb is of a high surface energy material, the inner surface of the capillary bore is of a low surface energy material, and the inner surface of the junction is of a low surface energy material.

The surface tension of the thermometric liquid is greater than the surface energy of the said low surface energy material by a factor of at least two, more preferably by a factor of at least 2.5 and most preferably by a factor of 4. In its most preferred embodiment, the said thermometric liquid has a surface tension greater than that of water.

The "junction" between the capillary and bulb is designed to provide for improved performance of maximum registration action by providing for sharp changes in the diameter of the bore, having optionally, ridged/roughened surface in the funnel shapes formed in the region of sharp diametric changes.

The present invention also relates to a process for making a non-mercury thermometer exhibiting maximum registration and showing no splits in the liquid column, said thermometer having a thermometric liquid substantially free of gases, wherein heating steps like sealing and printing on the thermometer can be conveniently carried out without vaporisation of the thermometric liquid or degradation of the low surface energy material of the inner surface of the capillary bore.

Constructional Features of the Thermometer:

The dimensions of the thermometer that is, length, capillary bore width, bulb volume, etc. depend upon the temperature range, and least count of temperature under consideration. Typically, the length of the thermometer of the invention is preferably from 5 to 50 cm, the area of the bore of the capillary is preferably from 0.0005 $mm^2$ to 0.004 $mm^2$ and the volume of the bulb is typically from 0.01 to 0.6 ml. The preferred range of dimensions for clinical use thermometers are as follows: length of the stem is 8-20 cms, the area of the bore of the capillary is 0.0007 $mm^2$-0.002 $mm^2$, and volume of the bulb is 0.03-0.1 ml.

The thermometer is suitably calibrated for reading temperatures spanning a range between the freezing point to the boiling point of the thermometric fluid. A clinical thermometer is typically calibrated to read temperatures between 32 and 42° C. Markings may be present in the thermometer (indicated as (7) in FIG. 1) and a cap with holder may also be provided (indicated as 6 in FIG. 1*a*).

Low Surface Energy Material for the Inner Surface of Capillary Bore and the Junction:

Preferably, the low surface energy materials employed in the present invention are selected from fluorocarbon or silicone based polymers or copolymers.

Optionally other low energy materials, such as aliphatic or aromatic polyolefins, polyesters, polymethylmethacrylate, polycarbonates may also be employed subject to the surface energy/surface tension constraint disclosed in EP 960322.

If a high surface energy material, such as glass, is employed for making structural parts of the thermometer, the inner surface of the thermometer parts, viz capillary bore and the junction, must be coated with a low surface-energy material. The coating material is selected based on the criterion that the surface energy of the modified glass surface should satisfy the constraint disclosed in EP 960322. One of the classes of compounds that satisfy this criterion is the organosilane. Some of the preferred reagents belonging to this class of compounds are the aliphatic alkoxy silanes and fluoroaliphatic alkoxy silanes. Their general chemical structure is [$RSi(OR')_n$], where R represents an aliphatic or a fluoroaliphatic group, and R' represents an aliphatic group. Examples of such compounds are octyltriethoxy silane [$C_8H_{17}Si(OC_2H_5)_3$], methyl triethoxy silane [$CH_3Si(OC_2H_5)_3$], and fluoroaliphatic trimethoxy silane [$R_fSi(OCH_3)_3$] (where $R_f$ represents fluoroaliphatic group). Alternatively, we may select the appropriate coating chemical from among the several materials that are commercially available for lowering the surface energy of glass or making glass hydrophobic. Examples of such materials are Glasscoat® (GE Chemicals), Dry-Coat® (Saint-Gobain) and Glassclad® (Fluorochem).

If a high surface energy material, such as glass, is employed for making structural parts of the thermometer, the inner surface of the thermometer parts, viz capillary bore and the junction, must be coated with a low surface-energy material. Some of the preferred reagents employed for the in place coating are allyl alkoxy silanes, fluoroaliphatic alkoxy silanes and fluoro aliphatic silyl ethers, such as octyltriethoxy silane, methyl trimethoxy silane, fluoroaliphatic trimethoxy silane, etc.

Thermometric Liquid & Additives

The thermometric liquid used in the thermometer of the invention is an aqueous solution of one or more solutes. The solutes are preferably selected from a range of salts that negatively adsorb at the air (or vapour)-water interface. Examples of such materials are salts of lithium, lanthanum, magnesium, calcium, sodium and potassium, individually or in combination. The preferred salts are halides of the above mentioned metals and the most preferred ones are chlorides of lithium and lanthanum. The concentration of such additives will vary depending on the material selected given variations in the physical properties such as the solubility limits, freezing point limits, surface tension, etc. Typically, the concentration of the solutes ranges from 15 to 40% w/w.

Suitable additives, such as colourants, dyes, etc. may be added to enhance the visibility of the thermometric liquid.

Process to Make the Thermometer:

The process of the invention applies to preparation of all types of liquid-in-stem thermometers exhibiting maximum registration, such as prismatic-stem and envelope-type thermometers, wherein in the junction region connecting the bulb to the capillary at least a first funnel shaped region with or without additional ridged/roughened surface theron is formed such as to provide a sharp changing border to narrower dimension of the fluid path from said bulb to the bore. Example of preparation of prismatic-stem thermometer, using glass as the structural material, is given below. However, most of the critical process steps would be functionally similar to that for the other types of liquid-in-stem maximum registration thermometers as well.

Preparation of the Stem-Tube Assembly:

Component 1: Bulb-Tube:

The material used to prepare the bulb-tube is in the form of canes. The cane is cut into small bulb tubes of desired length.

Component 2: Stem-Tube with the Funnel at the End:

The material used to prepare the stem in the form of long canes is cut into sticks of desirable length. A funnel shaped passage is formed in the capillary bore at the centre of each stick. The funnel-shaped passage is preferably of length 2-15 mm. The sticks are then cut at the centre of the passage to produce two stems, each with a funnel in the capillary bore at one end.

Stem-Bulb Tube Assembly:—

One end of the bulb tube is then fused to the funnel end of the stem-tube, using high-intensity flame to form a junction. Some examples of the features of the junction are shown in FIG. 2. These various features can be created during junction formation or by subsequent processing/treatment to the junction region. For example, by subjecting the bore to vacuum while simultaneously directing flame at appropriate locations on the exterior surface of the stem, one can create one or more constrictions. Further, the inner surface of the junction may be ridged/roughened, as shown in FIG. 2e-2g, using, say, mechanical microdrills or by chemical etching. The resulting assembly, consisting of the capillary, junction, and the bulb-tube with an open end, will be referred to as the 'stem-bulb tube assembly' in the rest of the present section.

In FIG. 2: 'C' refers to the capillary, 'J' to the junction, 'B' to the bulb, 'N' to the neck, 'Co' to the constriction and 'R' to sharp ridges/roughened surface.

Surface Treatment of the Inner Surface of Junction and Stem:

This step is required for a) reducing the surface energy of the inner surface of capillary, except at a small zone near the open end of the stem, b) reducing the surface energy of the junction. These requirements can be achieved through several methods, one of which is now discussed.

The first step is to hydrolyse the inner surface of the junction and the capillary bore but not the bulb-tube of the stem-bulb tube assembly. A small droplet of water is introduced from the open end of the bulb tube into the junction of the bulb tube and the stem. By capillary action, water enters into the capillary bore. Excess water from the bulb-tube is then drained off. The stem-bulb tube assembly is placed in a water bath. Preferably only the portion comprising of the stem and the junction is immersed in the water bath. The bath is maintained at about 100 degrees centigrade. After about 3-12 hours, the water column in the capillary is flushed out by passing compressed air. The residual water film in the capillary and the bulb-tube is then removed by drying the stem-bulb tube assembly in an oven.

The next step is to lower the surface energy of the inner surface of the junction and the entire length of the inner surface of the capillary except a small zone near the open end of the capillary by chemical coating. These requirements are satisfied by, for example, adopting the following non-limiting procedure. The open end of the capillary bore is tightly capped using an elastic sleeve, closed at one end, to minimise the leakage of air between the capillary bore and the external atmosphere. The wetting of the inner surface of the bulb-tube by coating chemical is prevented using another elastic sleeve, placed on the inside of the bulb-tube to cover its surface. A small drop of the coating chemical is then introduced from the open end of the bulb tube into the junction. By capillary action, the coating liquid enters into the capillary bore of the stem. However, since the open end of the stem is capped, as described above, the pressure of air trapped in the bore builds up as the liquid column in the capillary rises. Thus, eventually, a short length of the stem at the opposite end of the bulb-tube remains unwetted by the coating chemical.

The excess coating chemical in the bulb tube is then removed from the bulb-tube using, say, a syringe. For achieving permanent coating of the low energy chemical on the walls of the capillary bore and the junction, the stem-bulb assembly is cured in accordance with the procedures specified by the manufacturer of the coating chemical. The elastic sleeve, attached earlier to cap the end of the stem, is removed. The sleeve placed on the inside of the bulb tube is also removed.

The open end of the bulb tube is then fused using, for example, a flame, thus forming a bulb. The fusing is carried out in a manner such that the resulting closed bulb can hold a required volume of the thermometric liquid. The remaining portion of the bulb-tube is cut off after being subject to flame and removed by a suitable means, preferably pneumatically. The resulting assembly, comprising of a coated capillary bore, coated junction and an uncoated bulb, will be referred to as the stem-bulb assembly in the rest of the present section.

Filling of the Thermometric Liquid:

The purpose of this step is to fill the stem-bulb assembly with a thermometric liquid without entrapping appreciable amounts of undesirable gases. This step can be achieved in several ways, one of which is described below.

The stem-bulb assembly is placed in the vertical position inside an evacuation chamber. The chamber is connected, through valves, to a vacuum pump and to two reservoirs; one reservoir containing degassed water and the other containing degassed thermometric liquid. Also, the evacuation chamber is provided with a mechanism through which its internal volume could be altered to the desired extent. One example of achieving this would be to attach a flexible metallic bellow to the evacuation chamber. Compression or expansion of this bellow would contract or expand the available volume of the fluid in the chamber, thus increasing or decreasing the pressure of the fluid enclosed in the chamber.

The chamber is subject to a vacuum of about $10^{-6}$ torrs for about 6 hours. This step results in partial evacuation of air from the stem-bulb assembly. Degassed water is then filled into the chamber from the respective reservoir, and all valves leading to the chamber are closed. The volume of the chamber is then decreased to increase the pressure inside to about 1.5 atmospheres (absolute). The differential pressure existing between the chamber and the partially evacuated bulb pressurises water into the stem-bulb assembly. At the end of this step, the stem-bulb assembly contains water, in addition to residual air remaining from the partial evacuation step. Subsequently, water in the chamber is withdrawn into the respective reservoir. Water present inside the stem-bulb assembly is boiled off by subjecting the chamber to high vacuum while simultaneously heating the stem-bulb assembly through a suitable source of heat, for example an IR lamp. These process steps lead to further degassing of the stem-bulb assembly and the evacuation chamber. The degassed thermometric liquid is then filled into the chamber from the respective reservoir, and all valves leading to the chamber are closed. The volume of the chamber is decreased leading to an increase in the pressure of the liquid in the chamber to about 1.5 atmosphere (absolute). The thermometric liquid enters into the stem-bulb assembly due to the pressure differential existing between the chamber and the evacuated bulb, and continues until the stem-bulb assembly is completely filled with the thermometric liquid.

Sealing:

Several methods can be used to seal the stem-bulb assembly. The choice of the methods should be such that sealing can be carried out without vaporisation of the thermometric liquid or degradation of the coating material or introduction of gases into the stem-bulb assembly. An example of one such method is given below.

The stem-bulb assembly is removed from the chamber and placed in an environment whose temperature is ramped up such that the thermometric liquid constantly trickles out from the open end of the capillary. The open end of the stem is then connected to a diffusion pump operating at about $10^{-6}$ torrs. The stem-bulb assembly is subsequently placed in a vertical position in a water bath whose temperature is higher than the maximum temperature that the resulting thermometer is designed to read. A weak flame is then directed towards the stem, at a distance of about 2 cm from its open end (which lies within the uncoated zone of the stem). Simultaneously, the bulb is immersed in a water bath maintained at a temperature at which the liquid column in the capillary is withdrawn into the bulb. This result can also be achieved by applying, for example, a centrifugal force such that the liquid column in the capillary moves into the bulb, while the end of the stem is subject to vacuum and the bulb is at a sufficiently low temperature. An intense flame is subsequently directed towards the stem, at a distance of about 2 cm from its open end, until the capillary bore seals.

The resulting thermometers may optionally be graded and sorted based on the thermal expansivity of the liquid, followed by calibration.

Printing:

Several methods can be used to print the thermometer. The choice of the methods should be such that printing can be carried out without vaporisation of the thermometric liquid or degradation of the coating material.

The printing ink formulation may contain pigment, polymer precursors, ink dryers, reducer, catalyst, etc. in a desired ratio. Without being limited by the same, the ratio and the procedure adopted to obtain permanent printing on the stem is determined by the constraint that, the temperature at which the ink is cured/baked must be less than the temperature at which the coating chemical is destabilized.

In one of the printing processes, the ink is screen printed along the enamel side of the stem. The high-temperature baking of the printing ink on the stem is achieved as follows. The baking oven comprises of two parts: an upper part and a lower part. These two parts of the oven are separated by a perforated plate, preferably insulated. The thermometer is inserted through the perforation such that the stem lies in the upper part of the oven while the bulb and junction of the thermometer lies in the lower part of the oven. The upper part of the oven is maintained at a temperature necessary for the permanent curing of printing ink. Simultaneously, cold water is passed through the lower part of the oven. This apparatus allows for the curing of the printing ink while simultaneously avoiding build-up of vapour pressure inside the thermometer. At the end of the curing process, the thermometer is removed from the oven and excess stem length, if any is cut. The ends are given any suitable shape, preferably the ends are rounded.

The invention is now illustrated by the following non-limiting examples.

EXAMPLES

Comparative Example A

Process to Make a Non-Mercury Thermometer as Described in EP960322:

The material (glass) used to prepare the bulb was taken in the form of canes of length approximately 1500 mm length. The cane was cut into small bulb tubes of length of 26 mm.

The material (glass) used to prepare the stem was in the form of long canes. It was cut into sticks of length 158 mm, and the ends were nipped off. A funnel shaped passage in the capillary, of approximately 2 mm length, was formed at the centre of each stick. The sticks were then cut at the centre of the passage to produce two stem lengths of thermometer.

One end of the bulb tube was fused to the stem using flame. The open end of the stem was connected to vacuum. Simultaneously, a controlled flame was directed at a point on the stem which was about 2 cm above the bulb until the capillary contracted to the desired extent, as observed on the magnified image on a screen. The resulting assembly, consisting of the constricted capillary and the bulb tube whose other end is open, will be referred to as the stem-tube assembly in the rest of the present section.

The next step was to hydrolyse the inner surface of the stem-tube. Using nitrogen, water was pressurized into the stem-tube assembly. The stem-tube assembly, filled with water, was then laced in a water bath that was maintained at 100 degrees centigrade. After about 12 hours, the stem-tube assembly was removed and the water was flushed out of the capillary by passing compressed air. The residual water film in the capillary and the bulb tube was removed by drying the stem-tube assembly in an oven.

The next step was to reduce the surface energy of the inner surface of capillary. The coating chemical (GlassCoat™, ex GE Chemicals) was pressurized through the open end of the capillary stem using nitrogen gas until the liquid reached the constriction. The stem-bulb assembly was then placed in an oven whose temperature was maintained at 160° C. The treatment was repeated twice to obtain a flawless coating.

The open end of the bulb-tube was fused using flame, thus forming a bulb. The fusing was carried out in a manner such that the bulb can hold a required volume of the thermometric liquid. The remaining portion of the bulb-tube was cut off and removed by a suitable means, preferably pneumatically. The resulting assembly, comprising of a coated capillary bore and a bulb, will be referred to as the 'stem-bulb assembly' in the rest of the present section.

The next step was to fill the thermometric liquid into the stem-bulb assembly without entrapping air. This was achieved as follows. The stem-bulb assembly was placed in a vertical position inside an evacuation chamber. The chamber was connected, through valves, to a vacuum pump and to three reservoirs; one reservoir containing de-aerated water, one containing glycerol and one containing the thermometric liquid (35% lithium chloride solution). Also, the evacuation chamber was connected to a liquid metallic plunger, using which the inside volume of the chamber could be altered to the desired extent. The chamber was subject to vacuum of about 0.4 torrs for about 6 hours. This step resulted in partial evacuation of the stem-bulb assembly. De-aerated water was then filled into the chamber from the respective reservoir, following which all valves leading to the chamber were closed. Using the liquid metallic plunger, the pressure inside the fluid was increased to 1.5 atmospheres (absolute). Since the stem-bulb assembly had been earlier partially evacuated, water entered through the open end of the capillary due to differential pressure existing between the bulb and the chamber. At the end of this step, the stem-bulb assembly contained water, in addition to air remaining from the partial evacuation step. Subsequently, water in the chamber was withdrawn into the respective reservoir. Glycerol was then filled into the chamber from the respective reservoir, following which all valves leading to the chamber was closed. The chamber was then placed in a water bath maintained at 95° C. and subject to a vacuum of about 0.4 torrs. This step caused the water present inside the stem-bulb assembly to be boiled off. The glycerol in the chamber was then retracted into the respective reservoir. The thermometric liquid was then filled into the chamber from the respective reservoir, following which all valves leading to the chamber were closed. The metallic plunger was compressed leading to an increase in the pressure of the liquid in the chamber to about 1.5 atmosphere (absolute). The thermometric liquid entered into the stem-bulb assembly due to the pressure differential existing between the chamber and the evacuated bulb. This process continued until the thermometric liquid completely filled the stem-bulb assembly.

The next step was to seal the stem-bulb assembly. For this purpose, the thermometer was removed from the chamber, and its bulb was immersed in a water bath whose temperature was maintained at 42° C. A weak flame was applied at a distance of 2 cm from the end of the stem. Once the heated portion of the stem became red-hot, it was mechanically pinched and the portion of the stem above the pinched point was discarded.

The thermometer was sorted into the appropriate grade depending upon the expansion between 35 & 41 deg. C. The 35 & 41 marks were fixed and the distance between these marks was measured against a standard grading chart. The matching scale & numbers, however, could not be permanently screen-printed on the thermometer. Since the temperature at which the ink was required to be cured for attaining permanence on the stem glass exceeded the boiling point of the liquid, any attempts to cure the ink resulted in vaporization of the thermometric liquid which, in turn, caused breakage of the thermometer.

Example 1

Process to Make Non-Mercury Thermometer as Described in Present Patent:

The material (glass) used to prepare the bulb was in the form of canes of length approximately 1500 mm length. The cane was cut into small bulb tubes of length of 26 mm.

The material (glass) used to prepare the stem was in the form of long canes. It was cut into sticks of length 158 mm. A funnel shaped passage of approximately 2 mm length was formed in the capillary at the centre of each stick. The sticks were then cut at the centre of the passage to produce two stem lengths of thermometer, each having a funnel on one side of the capillary bore.

Using flame, one end of the bulb tube was fused to the funnel end of the stem-tube. Physical heterogenities, such sharp ridges, etc., formed during fusion were retained. The resulting junction formed was as shown in FIG. 2e.

The resulting assembly, consisting of the capillary, junction and bulb tube with an open end, will be referred to as the 'stem-bulb tube assembly' in the rest of the present section.

The next step was to hydrolyse the inner surface of the capillary and the junction, but not the bulb-tube. A droplet of water was placed at the junction. A water column entered into the capillary by capillary action. Excess water from the bulb-tube was drained off. The stem-bulb tube assembly was placed in a water bath such that only the portion comprising of the stem and the ridged junction was immersed. The bath was maintained at 100 degrees centigrade. After about 12 hours, the water column in the capillary was flushed out by passing compressed air. The residual water film in the capillary and the bulb tube was removed by drying the stem-bulb tube assembly in an oven.

The next step was to reduce the surface energy of the inner surface of the capillary and the junction, but not the bulb. Also, to prevent degradation of the coating chemical during sealing (a step to be discussed in detail later), it was necessary to leave a short length of the inner surface of capillary, typically about 3-4 cm from the open end of the stem, uncoated. These requirements were satisfied by adopting the following procedure. The open end of the capillary bore was tightly capped using an elastic sleeve, which was closed at one end, to minimise leakage of air between the capillary bore and the external atmosphere. The wetting of the inner surface of the bulb-tube by the coating chemical was prevented using another elastic sleeve, which covered the inner surface of the bulb-tube. A small drop of the coating chemical (GlassCoat™, ex GE Chemicals) was placed from the open end of the bulb tube at the junction between the bulb and the stem. By capillary action, a column of the liquid entered into the capillary bore. However, since the end of the stem was capped, the pressure of entrapped air increased as the liquid column in the capillary rose. Thus, finally, a short length of the stem remained unwetted by the coating chemical.

The excess coating chemical in the bulb-tube was removed from the bulb-tube using a syringe. For obtaining permanent coating of the low surface-energy chemical, the stem-bulb tube assembly was placed in an oven whose temperature was maintained at 160° C. The elastic sleeve, attached earlier to cap the end of the stem, was also detached. The elastic sleeve covering the inner surface of the bulb tube was also removed.

The open end of the bulb tube was fused using flame, thus forming a bulb. The fusing was carried out in a manner such that the resulting bulb can hold a required volume of the thermometric liquid. The remaining portion of the bulb-tube was cut off and removed by a suitable means, preferably pneumatically. The resulting assembly, comprising of a coated capillary bore, coated junction and uncoated bulb, will be referred to as the 'stem-bulb assembly' in the rest of the present section.

The stem-bulb assembly was placed inside an evacuation chamber. The chamber had connections, through valves, to a vacuum pump and to two reservoirs; one reservoir containing degassed water and the other containing the degassed thermometric liquid (35% lithium chloride solution). Also, the evacuation chamber was connected to a flexible metallic bellow. By contracting or expanding the bellow, the inside volume of the chamber could be altered to the desired extent.

The chamber was connected to a vacuum pump operating at about $10^{-6}$ torrs for 6 hours. This step resulted in partial evacuation of the stem-bulb assembly. The next step was to ensure complete removal of air from the stem-bulb assembly. For this purpose, degassed water was filled into the chamber from the respective reservoir, following which all valves leading to the chamber were closed. The bellow was then compressed to increase the pressure of the fluid inside the chamber to 1.5 atmospheres (absolute). Since the stem-bulb assembly had been earlier partially evacuated, water entered into the capillary due to differential pressure between the bulb and the chamber. At the end of this step, the stem-bulb assembly contained water, in addition to air remaining from the previous partial evacuation step. Subsequently, water in the chamber was retracted into the respective reservoir. Water present inside the stem-bulb assembly was boiled off by subjecting the chamber to high vacuum while simultaneously heating the thermometer by using an IR lamp. The thermometric liquid was then filled into the chamber from the respective reservoir, following which the all valves leading to the chamber were closed. The metallic bellow was compressed leading to an increase in the pressure of the liquid in the chamber to about 1.5 atmosphere (absolute). The thermometric liquid entered into the stem-bulb assembly due to the pressure differential existing between the chamber and the evacuated bulb. This process continued until the stem-bulb assembly was completely filled with the thermometric liquid. The chamber was then cooled.

The next step was to seal the stem-bulb assembly without causing the thermometric liquid to vaporise or the coating chemical to be destabilised/charred. For this purpose, the stem-bulb assembly was removed from the chamber, and placed in an environment whose temperature was ramped up such that the thermometric liquid constantly trickled out from the open end of the capillary. The open end of the stem was then connected to a diffusion pump operating at about $10^{-6}$ torrs and. The stem-bulb assembly was placed in a vertical position at room temperature, with its bulb immersed in a bath whose temperature was above the maximum temperature that the resulting thermometer was designed to read. A weak flame was subsequently directed towards the stem, at a distance of about 2 cm from its open end (which lies within the uncoated portion of the stem). Simultaneously, the bulb was immersed in a water bath maintained at a temperature at which the liquid column in the capillary was withdrawn into the bulb. The intensity of the flame was increased causing the capillary bore to seal.

The thermometer was sorted into the appropriate grade depending upon the expansion between 35 & 41 deg. C. The 35 & 41 marks were fixed and the distance between these marks was measured against a standard grading chart.

The next step was to print the thermometer with graduations. For this purpose, catalyst (CS1860/C™ ex Coates of India Ltd.), ink drier, reducer (CX 2207™ ex Coates of India Ltd.) and black ink (CS 1870™ ex Coates of India Ltd.) were mixed in the ratio: 2:2:5:20. The resulting composition was screen printed along the enamel side, following which the ink was baked as follows. The thermometer was fully shaken-down such that the thermometric liquid was entirely contained in the bulb. The baking oven comprised of two parts: an upper part and a lower part. These two parts of the oven were separated by an insulated perforated plate. The thermometer was inserted through the perforation such that the stem of the thermometer was present in the upper part of the oven while the bulb and the junction of the thermometer was present in the lower part of the oven. The upper part of the oven was maintained at 140° C. Simultaneously, cold water, whose temperature was maintained at 10° C., was passed through the lower part of the oven. At the end of the curing process, the thermometer was removed from the oven and excess stem length, if any is cut. The ends were then rounded.

Performance Evaluation of the Thermometers:

The thermometers prepared by the process of Comparative Example A and Example 1 were compared. The parameters used to measure and compare the performance characteristics of these two sets of thermometers were a) response time, b) shakedown, c) accuracy, d) maximum registration and e) durability of printing ink. 50 thermometers were evaluated over a period of 4 months by 6 panellists.

The response time of the thermometer was measured as follows. The room temperature was maintained at 20 C. The thermometer was held vertically, and its bulb was immersed in a water bath whose temperature was maintained at 41° C. The time taken by the thermometer to reach the 41° C. mark was taken to be the response time.

The test for maximum registration was carried out as follows. The bulb of the thermometer was warmed in a water bath to 41 degree Centigrade, following which the initial reading of the thermometer was taken. Any discrepancies or inaccuracies w.r.t the bath temperature was noted. The thermometer was then removed from the bath and held in the vertical position with the bulb facing down. After three minutes, the second temperature reading was recorded, and checked for any discrepancies w.r.t the initial reading.

The test for shakedown of the thermometric liquid was performed by two methods, as detailed below. In the first method, the thermometer was shaken down by holding the stem by hand near its tip, as is normally followed in households for shake-down of mercury thermometers. Each thermometer was shaken down for ten times. In the second method, the thermometric liquid was shakedown down in a centrifuge with the force at the junction of the bore being 50 g directed towards the bulb. This method is recommended by BS 691 and TS 5216 Standards. Shakedown was considered to be satisfactory if the thermometric column receded to a point that was below the lowest calibrated temperature.

In order to determine the degree of permanence of the printing ink, a standard phenol tolerance test was carried out on the thermometer of example 1. For this purpose, a 5% phenol solution in water was prepared, and was maintained at a temperature of 39° C. The thermometer was immersed in this phenol bath for twenty minutes, taken out and then rinsed with water. The degree of fading or peeling of the ink was then examined.

The results of the performance evaluation of the thermometers are presented in Table 1.

TABLE 1

|  | A | 1 |
| --- | --- | --- |
| Response Time (seconds) | 25 | 25 |
| Accuracy (° C.) | ±0.6 C | ±0.05 C |
| Maximum registration | Exhibited | Exhibited |
| Shakedown | Shake-down achieved only in the centrifugal shakedown method, wherein the centrifugal force at the constriction was 150 g directed towards the bulb | Shakedown achieved: 1) In the centrifugal shakedown method, wherein the centrifugal force at the junction was 50 g directed towards the bulb 2) In the manual shakedown method also |
| Permanence of printing ink | Not applicable, since baking of the ink on the stem could not be carried out | Printed ink found to be intact on the stem (no fading/peeling) |

Thus the thermometers prepared in accordance with the invention showed easy shakedown, and superior accuracy.

In addition, the new process of making the thermometer had three specific benefits over the one followed earlier. First, there was no degradation of coating chemical near the fused end of the stem which resulted in a charred/peeled coating in the earlier process. Second, since the thermometric liquid was completely withdrawn into the bulb during the sealing step, prior to flame-sealing, any issues associated with build up of internal pressures was avoided. On the other hand, the presence of the thermometric liquid at the sealing zone of the capillary in Example A caused build-up of high internal pressure, which led to puncturing/breakage of thermometers on several occasions. Third, the new process of baking the ink on the stem of the thermometer at high temperatures while simultaneously maintaining the bulb temperatures low enabled us to effectively print the thermometers without building up internal pressure.

In summary, the present invention relates to an accurate, single use or multiple-use non mercury liquid-in-stem thermometer that exhibits maximum registration. The invention also relates to a process of making such a thermometer.

The invention claimed is:

1. A liquid-in-stem thermometer comprising a stem and/or an envelope having a capillary bore extending along the length of the stem/envelope, a bulb disposed at one end of the stem/envelope and in fluid communication with the said bore, a junction region between the capillary and the bulb, wherein the inner surface of said junction region is ridged or roughened, a thermometric liquid provided in the bulb, the said thermometric liquid being an aqueous solution of one or more solutes and substantially free of dissolved gases, at least the inner surface of the capillary bore of said stem/envelope having low surface energy characteristics, wherein the surface tension of the thermometric liquid is greater than the surface energy of the said low surface energy material by a factor of at least two; characterised in that the junction region is adapted for maximum registration action and the inner surface of the bulb has a high surface energy; and wherein the capillary bore does not have a constriction.

2. A liquid-in-stem thermometer as claimed in claim 1 wherein said junction between capillary and bulb comprise at least a funnel shaped region of sharp changing diameter from a broader to narrower dimension towards the bore.

3. A liquid-in-stem thermometer as claimed in claim 2 wherein the entire stem/envelope is made of the low surface energy material.

4. A liquid-in-steam thermometer as claimed in claim 1 wherein the said surface tension of the thermometric liquid is greater than the surface energy of the said low surface energy material by a factor of at least 2,5 and most preferably by a factor of 4.

5. A liquid-in-stem thermometer as claimed in claim 1 comprising thermometric graduation permanently screen printed.

6. A liquid-in-stem thermometer as claimed in claim 1 wherein the concentration of the solutes ranges from 15 to 40% w/w.

* * * * *